United States Patent
Bruzy et al.

(10) Patent No.: US 6,710,570 B2
(45) Date of Patent: Mar. 23, 2004

(54) OPTIMIZED CONTROL OF FLAP ACTUATOR OF A MOTOR-VEHICLE AIR-CONDITIONING INSTALLATION

(75) Inventors: Christophe Bruzy, Beynes (FR); Philippe Richardot, Vesoul (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/052,517

(22) Filed: Jan. 23, 2002

(65) Prior Publication Data

US 2002/0097017 A1 Jul. 25, 2002

(30) Foreign Application Priority Data

Jan. 25, 2001 (FR) .............................. 01 00988

(51) Int. Cl.$^7$ .............................. G05B 19/40; H02P 8/00
(52) U.S. Cl. ...................................... 318/685; 318/696
(58) Field of Search .............................. 318/685, 807, 318/503, 432, 687, 696

(56) References Cited

U.S. PATENT DOCUMENTS

| | | | | |
|---|---|---|---|---|
| 4,254,368 A | * | 3/1981 | Ido et al. ..................... | 318/603 |
| 4,496,891 A | | 1/1985 | Kobayashi .................. | 318/696 |
| 4,791,345 A | * | 12/1988 | Boillat ........................ | 318/696 |
| 5,107,194 A | * | 4/1992 | Poehlein ..................... | 318/696 |
| 5,396,869 A | * | 3/1995 | Suzuki et al. ............... | 123/399 |
| 5,762,384 A | * | 6/1998 | Bartel ......................... | 292/216 |
| 6,016,044 A | * | 1/2000 | Holdaway .................... | 318/696 |
| 6,073,689 A | * | 6/2000 | Mizuno ....................... | 165/201 |
| 6,414,455 B1 | * | 7/2002 | Watson ....................... | 318/432 |
| 6,462,503 B1 | * | 10/2002 | Narazaki .................... | 318/696 |

FOREIGN PATENT DOCUMENTS

| | | | | |
|---|---|---|---|---|
| EP | 0 242 039 A2 | | 10/1987 | ............. H02P/8/00 |
| EP | 0 654 892 A1 | | 5/1995 | ............. H02P/8/00 |
| JP | 08051795 A | * | 2/1996 | ............. H02P/8/38 |

* cited by examiner

*Primary Examiner*—Robert Nappi
*Assistant Examiner*—Patrick Miller
(74) *Attorney, Agent, or Firm*—Ronald Courtney

(57) ABSTRACT

During the actuation of the flap, the drive frequency of the stepper motor is reduced as a function of the requirements for torque delivered by the motor in order to shift the flap. To that end, information is continuously gathered representing the requirements for torque delivered by the motor in order to shift the flap, the drive frequency is reduced, if appropriate, in response to a detected increase in the torque requirements and, when the drive frequency is below a predetermined maximum frequency, the drive frequency is increased, if appropriate, in response to a detected reduction in the torque requirements.

In that way, the power of the actuators can be limited while coping with momentary peaks in torque requirements.

9 Claims, 4 Drawing Sheets

OPTIMIZED CONTROL OF FLAP ACTUATOR OF A MOTOR-VEHICLE AIR-CONDITIONING INSTALLATION

FIELD OF THE INVENTION

The invention relates to actuators of flaps for distribution or mixing of air or for recirculation (air intake) in motor-vehicle air-conditioning installations.

BACKGROUND OF THE INVENTION

In such installations, the flaps are moved by geared-down motors in response to actuation commands produced by a central control unit on the basis of the requirements to be satisfied, such as starting or stopping of ventilation, adjustment of ambient temperature, demisting, deicing, etc.

Whether it is to respond as rapidly as possible to the requirements, or to cope with particular situations, for example detection of pollution, it is desirable to shift the flaps so as to bring them into the desired position in the shortest possible time.

To that end, the geared-down motors, generally stepper motors, are chosen to deliver the necessary power to drive the flaps at maximum speed under all circumstances, that is to say whatever the fluctuations in the power-supply voltage and the requirements in terms of torque. The torque requirements are variable not only on the basis of the technology of the flaps and of the nature of their drive kinematics, but also on the basis of instantaneous conditions, such as ventilation power, back-pressure exerted on the flap and acting in opposition to the desired movement, temperature, etc.

The geared-down motors used in the known air-conditioning installations are therefore over-dimensioned in terms of power in order to satisfy the torque requirements.

SUMMARY OF THE INVENTION

The object of the invention is to allow the use of geared-down motors of lower power than those habitually used nowadays, so as to reduce the costs of the air-conditioning installations, but while satisfying the torque requirements and without substantially penalising the speed of execution of the actuation commands.

This object is achieved, in accordance with the invention, by a method of control of an actuator stepper motor according to which, during the actuation of the flap, the drive frequency of the stepper motor is adapted to the requirements for torque delivered by the motor for shifting the flap.

The adaptation of the drive frequency can be achieved by continuously gathering information representing the requirements for torque delivered by the motor in order to shift the flap, the drive frequency being reduced, if appropriate, in response to a detected increase in the torque requirements and, when the drive frequency is below a predetermined maximum frequency, the drive frequency being increased, if appropriate, in response to a detected reduction in the torque requirements.

Advantageously, in response to an actuation command, the operation of the stepper motor is initially ordered at the predetermined maximum frequency.

The variation in the drive frequency can be achieved in a practically continuous way on the basis of the fluctuations in the detected-torque requirements, or in steps, the change from one step to another being ordered in response to the crossing of a threshold by the detected-torque requirements.

By modulating the drive frequency, as appropriate, and thus the speed of the stepper motor on the basis of the torque requirements, the method according to the invention makes it possible to optimise the use of the available power. An over-dimensioning of the power, as would be necessary to deal with peaks in torque requirements during transient periods within the phase of movement of the flaps, becomes pointless. Any such transient periods rarely represent more than 20% of the total time of actuation of the flaps, such that the slowing of the motor during any such transient periods does not substantially affect the total duration of the actuation.

With the duration of actuation being restricted, it is possible, without risk of excessive heating, to make the stepper motor function in over-powered mode, by application of a power-supply voltage corresponding to a mode of operation with excess power. By way of safety, it is then possible to cause stopping of the motor if a heating-limit temperature is exceeded.

The detection of the requirements for torque delivered by the motor can be made by measuring a quantity directly or indirectly representative of the torque, such as a voltage measurement on one phase of the motor, a measurement of the current in a winding of the motor or measurement of the instantaneous rotational speed of the motor, a slowing below a certain limit, in this latter case, signifying the crossing of a torque-value threshold for the drive frequency used.

A further object of the invention is to provide an actuator allowing implementation of the method defined above.

This object is achieved by virtue of a flap actuator comprising a stepper motor for driving the flap, an electrical power-supply circuit for the motor, a control input and a control unit linked to the control input and to the electrical power-supply circuit for delivering to the stepper motor a power-supply voltage at a given frequency in response to an actuation command received on the control input, an actuator in which, in accordance with the invention:

means are provided for supplying the control unit with information representing the torque requirements which the motor has to deliver in order to shift the flap, and the control unit comprises means for adapting the drive frequency of the stepper motor on the basis of the said information representing the torque requirements.

A further subject of the invention is a vehicle air-conditioning installation comprising at least one actuator.

BRIEF DESCRIPTION OF THE DRAWINGS

The invention will be better understood on reading the description given below by way of indication but not limitation, by reference to the attached drawings, in which.

DESCRIPTION OF THE PREFERRED EMBODIMENTS

Figure 1:
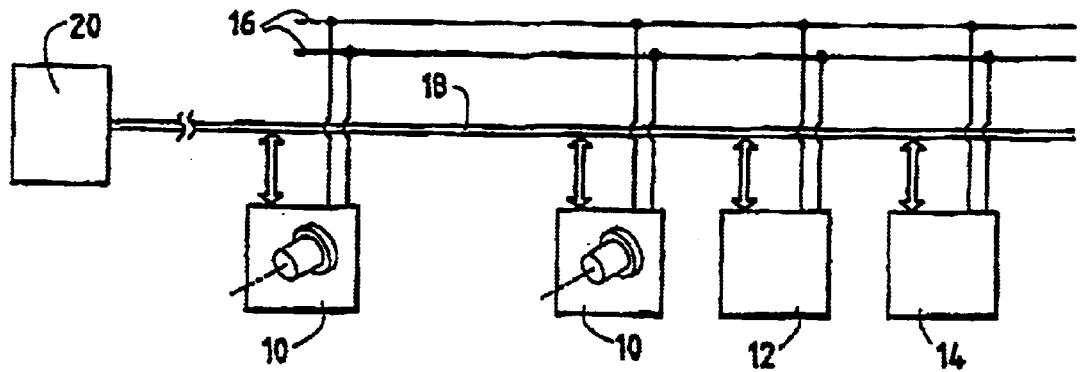
FIG. 1 very diagrammatically illustrates the components of a motor-vehicle air-conditioning installation.

As FIG. 1 shows very diagrammatically, a motor-vehicle air-conditioning installation conventionally comprises a plurality of actuators 10 (only two of which are shown on the figure) for controlling the shifting of flaps for distribution and mixing of air so as to carry out desired functions of ventilation, passenger-compartment temperature adjustment, demisting, deicing, etc, which are controlled from a control panel 12.

The actuators 10, as well as the control panel 12 and temperature probes 14, are linked to an energy bus 16 bringing in the battery voltage of the vehicle or a voltage derived from it, and to an information link 18.

By reason of the sophistication of the motor-vehicle air-conditioning installations, which is conveyed by an increasing number of components in these installations, and in order to avoid having recourse to bulky harnesses of conducting wires, the link 18 advantageously consists of an information bus. The bus 18 is linked to a central control unit 20. This receives status information originating from the control panel 12, from the probes 14 and from the actuators 10, such as information on the position of the flaps, and transmits control information, especially flap-actuation commands, by addressing the actuators 10, the latter each having a specific address.

Figure 2:
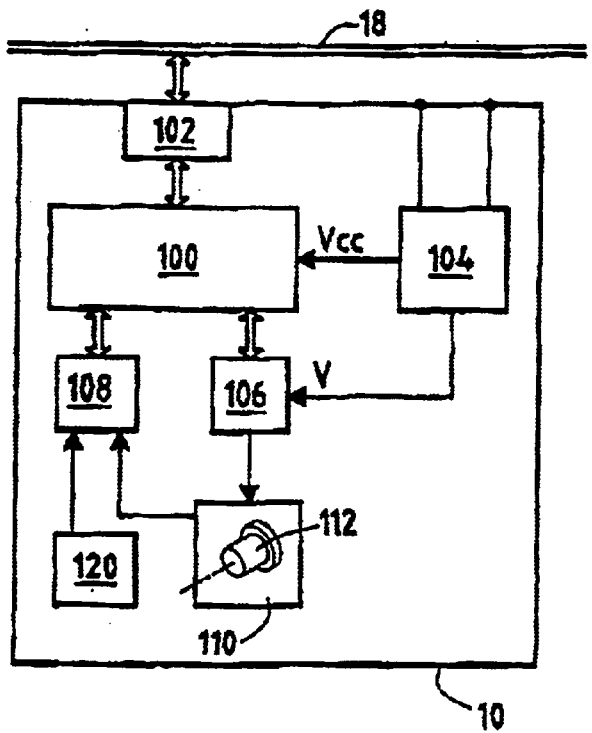
FIG. 2 is a diagram of one embodiment of a flap actuator in accordance with the invention.

As FIG. 2 shows in more detail, each actuator 10 comprises a microprocessor-based control unit 100 linked to the information bus 18 via a bus interface 102. An electrical power-supply circuit 104 linked to the energy bus 16 comprises voltage-regulation, protection and filtering circuits for delivering a logic power-supply voltage Vcc to the control unit 100 and a motor power-supply voltage V to an analogue interface circuit 106. A geared-down motor 110 coupled to an air-mixing or distribution flap (not represented) comprises a stepper motor 112 which receives the voltage V, from the circuit 106, in the form of pulse trains applied to the phases of the motor at a defined drive frequency, under the control of the unit 100 to which the interface 106 is linked. A data interface 108 is linked to the geared-down motor 110 and to the control unit 100 in order to transmit status data to it, especially data on the position of the flap, for example indicating the arrival of the flap at the end of travel.

An air-conditioning installation and an actuator as described above are known to the person skilled in the art, so that a more detailed description is not necessary.

In accordance with the invention, the actuator 10 further comprises a circuit 120 supplying information representative of the torque requirements delivered by the stepper motor 112, in order to shift the flap, and the control unit 100 is programmed in such a way as, if appropriate, to modify the drive frequency of the motor 112, and thus its speed, on the basis of the information supplied by the circuit 120 and received by the control unit, via the data interface 108 for example.

Detailed embodiments of a circuit 120 will be described later on by reference to FIGS. 4 and 6.

The drive frequency is adapted during the period of actuation of the flap in order to adjust the torque as a function of the requirements. To a given drive frequency there corresponds a limit torque. By limit torque is understood here the maximum torque which could be required from the motor in order to shift the flap. If the torque requirement becomes greater, the reduction in the drive frequency by the unit 100 makes it possible to increase the limit torque. If then the torque requirement reduces, the drive frequency can be re-increased by the unit 100, with a corresponding reduction in the limit torque.

Figure 3:
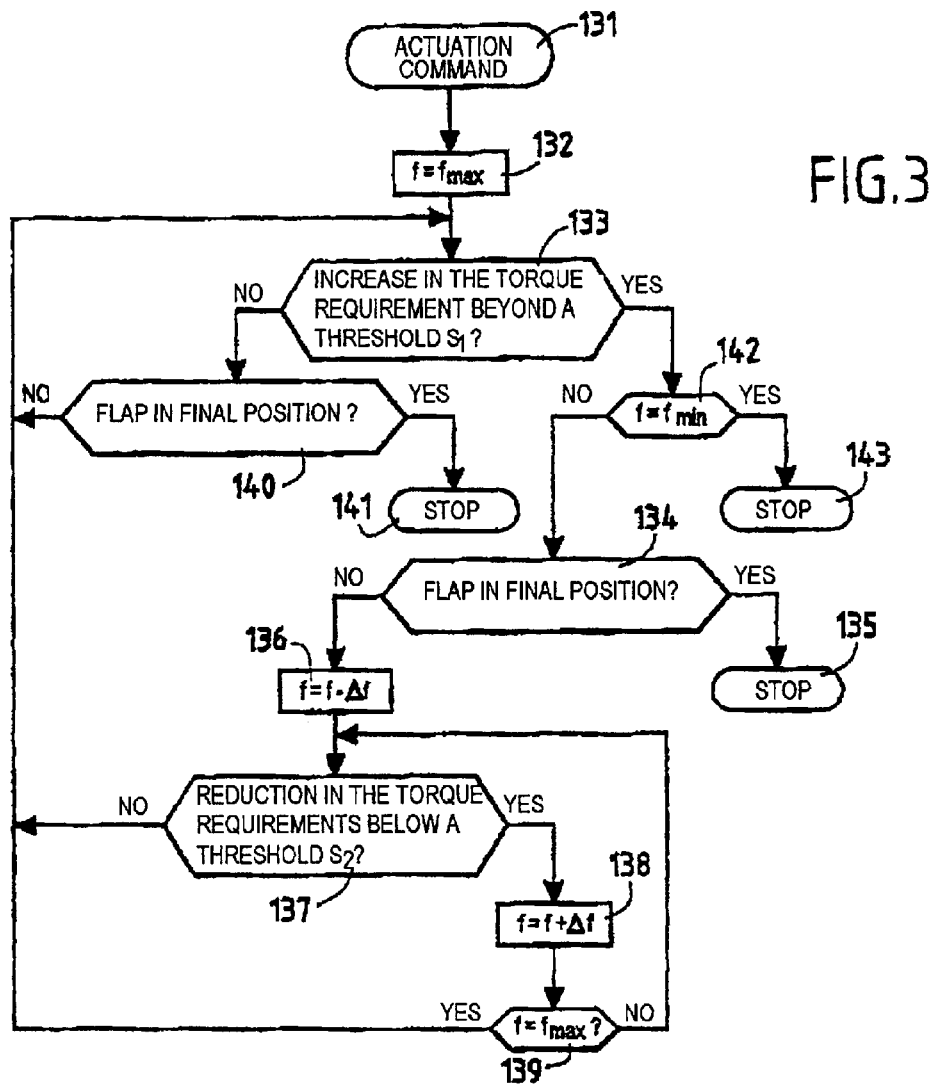
FIGS. 3 and 5 illustrate processes for motor-speed management with an actuator such as that of FIG. 2.

The management of the drive frequency of the motor 112 by the control unit 100 is carried out, for example, as follows (FIG. 3).

In response to an actuation command received via the bus interface 102 (phase 131), the starting of the motor 112 is ordered, at a drive frequency f equal to the nominal frequency $f_{max}$, which is the maximum drive frequency of the motor (phase 132). The frequency $f_{max}$ is chosen so as initially to drive the motor in rotation at a maximum speed preferably corresponding to an over-powered regime. By over-powered regime is understood here a mode of operation at a power greater than the rated power of the motor, which is made possible by the reduced duration of operation during a phase of flap actuation, and makes it possible to optimise the use of the available power.

When it is detected, on the basis of the information received from the circuit 120, that the requirement for torque delivered by the motor 112 is increasing beyond a predetermined threshold $s_1$ (test 133), it is checked whether the flap has arrived at its final position (test 134). If yes, the motor is stopped (stage 135); otherwise, the drive frequency is reduced by one increment f so as to move to the value f−f (stage 136).

When, after moving to the value f−f, a reduction in the torque requirements below a predetermined threshold $s_2$ is detected (test 137), the drive frequency is increased by the value f (stage 138); otherwise, test 133 is returned to.

When, after moving to the value f+f (stage 138), the value $f_{max}$ is reached (test 139), test 133 is returned to; otherwise, test 137 is returned to.

If the test 133 does not indicate a crossing of the threshold $s_1$, the frequency $f_{max}$ is retained, and a loop leads back to test 133, if the flap has not arrived at its final position (test 140), causing the stopping of the motor (stage 141).

The arrival of the flap in final position can be recognised by the control unit 100 in response to the reception of status information (for example arrival at end stop) corresponding to this final position.

The process of FIG. 3 makes it possible to achieve an adaptation of the drive frequency to the torque requirements in a near-continuous way, by choosing a relatively small value for the increment f. By way of example, provision could be made for a possible drive frequency f excursion between values of 600 Hz and 1200 Hz in increments of 5 Hz. A safety feature could be provided in order to stop the motor (stage 143) if an increase in torque requirements is detected by the test 133 although the drive frequency is at a minimum value $f_{min}$ (test 142).

Figure 4:
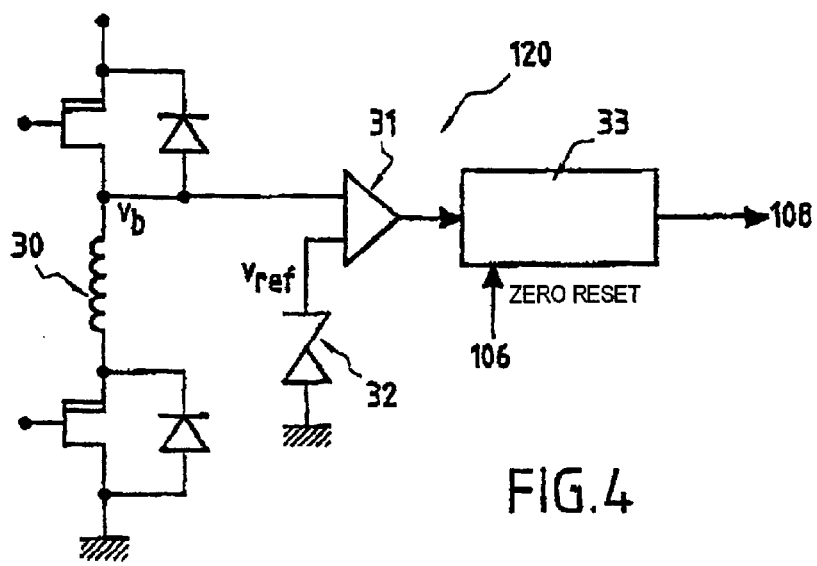
FIGS. 4 and 6 diagrammatically illustrates two embodiments of a torque-requirements detection circuit for an actuator such as that of FIG. 2.

FIG. 4 diagrammatically illustrates an embodiment of a torque-requirements detection circuit 120, of a type known in itself, capable of being used for implementing the process of FIG. 3.

The voltage $V_b$ at the terminals of a coil 30 of the motor 112 is compared by a comparator 31 with a reference voltage $V_{ref}$ fixed by a diode 32. The reference voltage is fixed at a value higher than the voltage normally present at the terminals of the coil 30 when the motor is delivering the rated torque corresponding to the frequency at which it is driven.

When the voltage $V_b$ exceeds $V_{ref}$, signifying an increase in the torque requirements, the comparator 31 triggers a timing count by a counter 33. The value counted by the counter 33 constitutes the information forwarded to the control unit 100 via the interface 108.

The threshold $s_1$ is fixed at a time value signifying the persistence of the increase in the torque requirement.

When the frequency f has been reduced in response to the crossing of the threshold $s_1$, the counter 33 can be reset to zero by the control unit 100 via the interface 106.

The threshold $s_2$ is fixed at a time value less than $s_1$.

Figure 5:
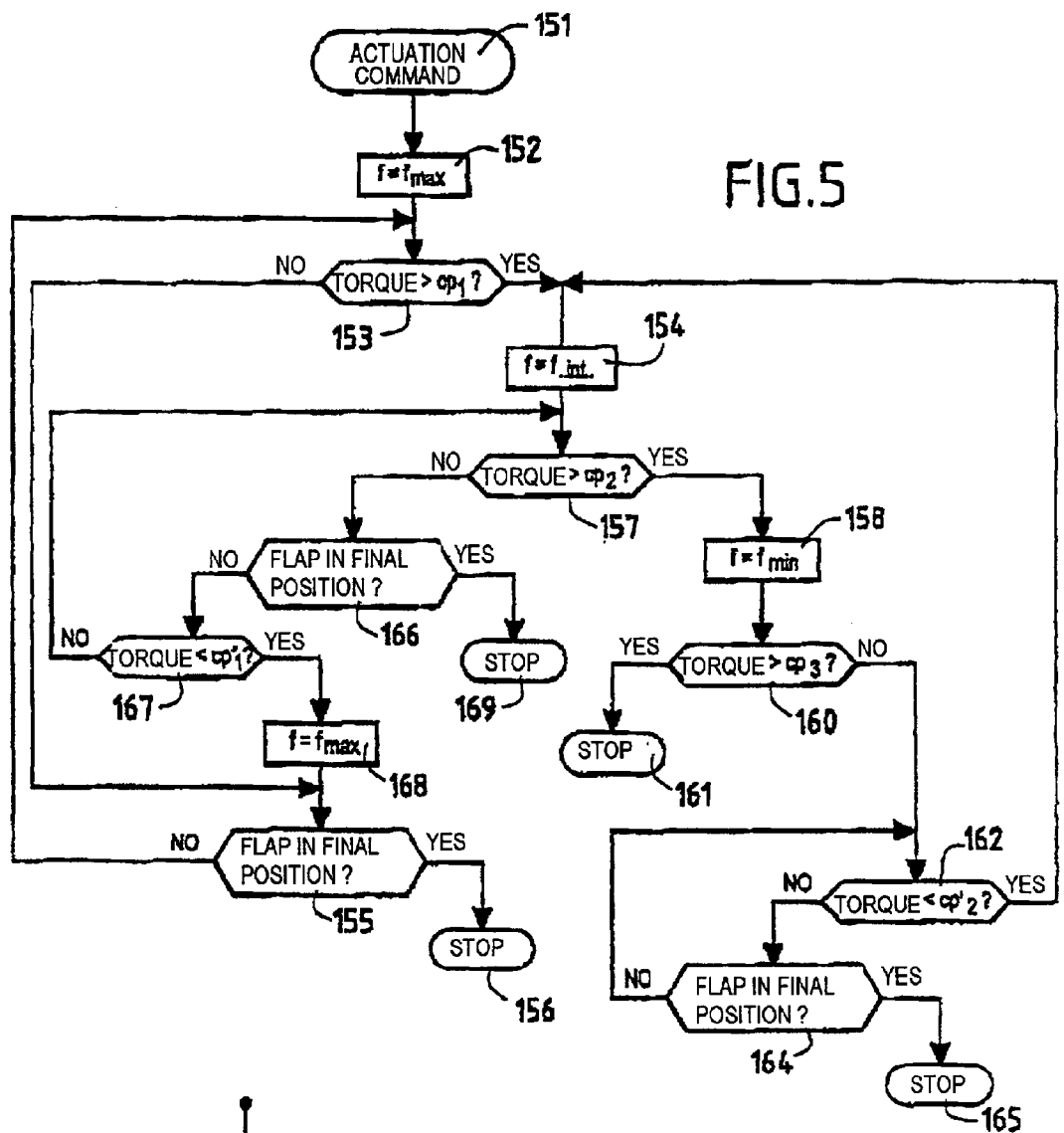

FIG. 5 illustrates another implementation of the management of drive frequency of the motor, the management being carried out not continuously but in steps, the drive frequency possibly taking three values, for example: maximum $f_{max}$, intermediate $f_{int}$ and minimum $f_{min}$. Repeating the preceding example of a possible frequency excursion between 600 and 1200 Hz, $f_{max}$ could be chosen equal to 1200 Hz, $f_{int}$ equal to 900 Hz and $f_{min}$ equal to 600 Hz. Moreover, the information forwarded by the circuit 120 here is representative of the value of the instantaneous torque.

In response to an actuation command received (phase 151), the starting of the motor is ordered at the frequency $f_{max}$ (phase 152).

If the instantaneous torque exceeds a first threshold $cp_1$ (test 153), the drive frequency f is reduced so as to move to the intermediate value $f_{int}$ (stage 154); otherwise, it is detected whether the motor has arrived at its final position (test 155) in order, if so, to stop the motor (stage 156) or, if not, to go back to test 153.

After moving to the frequency $f_{int}$, it is detected whether the instantaneous torque exceeds a second threshold $cp_2$ (test 157). If yes, the frequency is again reduced and moves to $f_{min}$ (stage 158). It is then detected whether the torque exceeds a third threshold $cp_3$ (test 160), so as, if appropriate, to cause an emergency stopping of the motor (stage 161).

If the threshold $Cp_3$ is not exceeded, it is detected whether the instantaneous torque becomes lower than a threshold $cp'_2$ (test 162). If yes, the drive frequency is increased so as to move to the intermediate value $f_{int}$ (phase 154); otherwise, it is ascertained whether the flap is in final position (test 164) in order, if so, to stop the motor (stage 165) and, if not, to return to test 162.

If the test 157 indicates that the threshold $cp_2$ is not exceeded, it is ascertained whether the flap is in final position (test 166) in order, if so, to stop the motor (stage 169) and, if not, to detect whether the torque becomes less than a threshold $cp'_1$ (test 167). If this is the case, the drive frequency is increased so as to move to the frequency $f_{max}$ (phase 168); otherwise, test 157 is returned to.

After moving to the frequency $f_{max}$, test 155 is entered.

Figure 6:
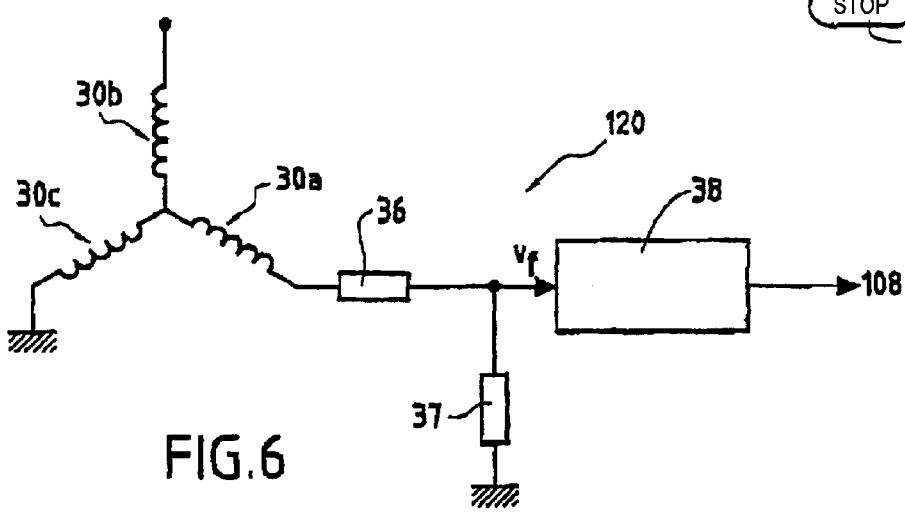

FIG. 6 diagrammatically illustrates an embodiment of a torque-requirements detection circuit 120, of a type known in itself, capable of being used for implementing the process of FIG. 3.

A voltage $V_f$ representative of the current traversing a coil 30a, 30b or 30c of the motor 112 is picked up at the mid-point of a voltage divider formed by two resistors 36, 37 in series with a coil, in this instance the coil 30a. The voltage $V_f$ is digitised by an A/D converter circuit 38 and forwarded to the control unit 100 via the interface 108.

The voltage Vf represents the counter-electromotive force produced during rotation of the motor. When the motor slows, the sign of an increase in torque, the voltage $V_f$ decreases. It is therefore inversely proportional to the torque delivered by the motor.

In the embodiment of FIG. 5, the values $cp_1$, $cp_2$, $cp_3$ are chosen as a function of the limit torques for the frequencies $f_{max}$, $f_{int}$, $f_{min}$, more precisely a little below these limit torques.

Figure 7:
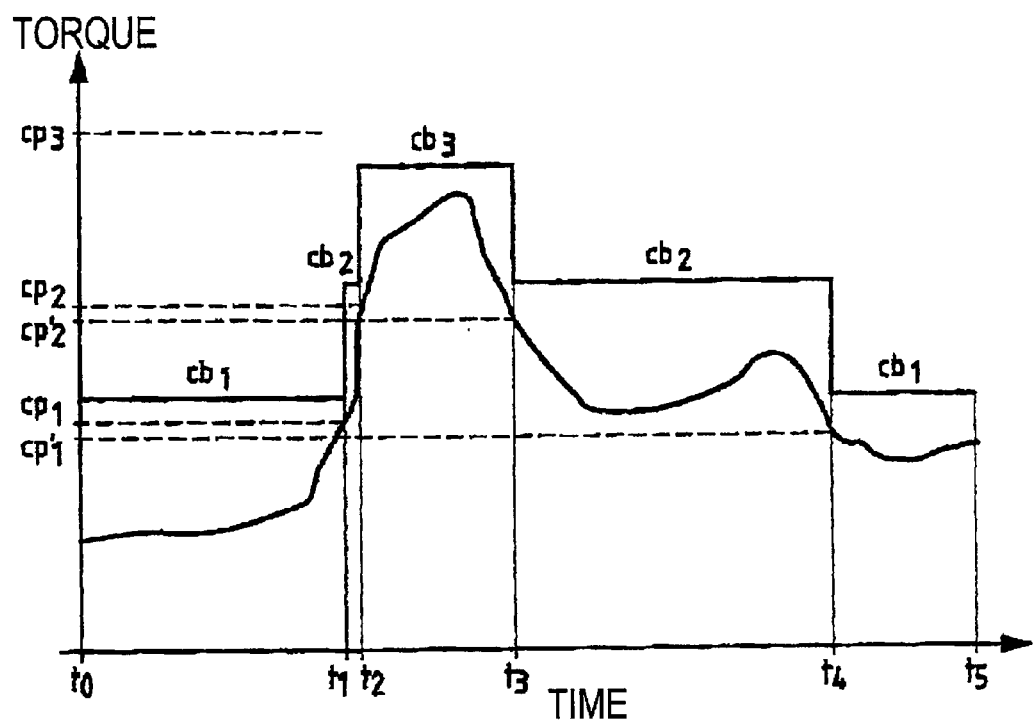
FIG. 7 graphically illustrates the variation in time of the torque delivered by an actuator stepper motor during a phase of shifting of a flap between two positions.

FIG. 7 shows a curve which represents the variation in the torque delivered by a stepper motor during actuation of an air-inlet flap. A momentary increase in the torque requirements will be observed.

The torque thresholds $cp_1$, $cp_2$, $cp_3$ are represented, as are the limit torques $cb_1$, $cb_2$, $cb_3$ corresponding to the frequencies $f_{max}$, $f_{int}$ and $f_{min}$.

The torque thresholds $cp'_1$ and $cp'_2$, are also represented. In order to avoid instability, values for $cp'_1$ and $cp'_2$ will be chosen to be slightly less than those for $cp_1$ and $cp_2$, respectively.

The flap is driven at maximum speed corresponding to $f_{max}$ between the times $t_0$ (starting) and $t_1$ (crossing of $cp_1$) and the times $t_4$ (crossing of $cp'_1$) and $t_5$ (arrival of the flap in final position). Between the times $t_1$ and $t_2$ (crossing of $cp_2$) and the times $t_3$ (crossing of $cp'_2$) and $t_4$, the flap is driven at intermediate speed corresponding to $f_{int}$. Between the times $t_2$ and $t_3$, the flap is driven at minimum speed corresponding to $f_{min}$.

Needless to say, the embodiment of FIG. 3 could be modified in order to control the drive frequency in steps, while the embodiment of FIG. 5 could be modified to control the drive frequency in a near-continuous way.

What is claimed is:

1. Method for controlling a flap-actuator stepper motor provided for actuating a flap of a motor-vehicle air-conditioning installation, the stepper motor is controlled by a controlling unit, the method comprising the steps of:

actuating the stepper motor;

delivering to the stepper motor a power-supply voltage at a drive frequency in response to an actuation command;

continuously gathering an information representing torque requirements for torque delivered by the stepper motor in order to shift the flap;

supplying the control unit with the information representing the torque requirements; and reducing the drive frequency of the power-supply voltage in response to a detected increase in the torque requirements; and increasing the drive frequency of the power-supply voltage in response to a detected reduction in the torque requirements when the drive frequency is below a predetermined maximum frequency, wherein the drive frequency is made to vary in steps, the move from one step to another being ordered in response to the crossing of a threshold by the detected-torque requirements.

2. Method according to claim 1, wherein in response to the actuation command, the operation of the stepper motor is initially ordered at the predetermined maximum frequency.

3. Method according to claim 1, wherein the drive frequency is made to vary in a near-continuous way as a function of fluctuations in the detected-torque requirements.

4. Method according to claim 1, wherein the step of varying the drive frequency in steps, the move from another step to a third step being ordered in response to the crossing of a second threshold by the detected-torque requirements.

5. Method according to claim 1, wherein the motor is fed in over-powered mode.

6. Method according to claim 1, wherein the information is gathered representing the torque requirements by detecting a quantity representative of the instantaneous torque delivered by the motor.

7. Flap actuator for a motor-vehicle air-conditioning installation, the flap actuator comprising:

a stepper motor (112) for driving a flap, an electrical power-supply circuit (104) for the motor, a control input (102) and a control unit (100) linked to the control input and to the electrical power-supply circuit (104) for delivering to the stepper motor (112) a power-supply voltage at a given frequency in response to an actuation command received on the control input (102), and a first means (120) for supplying the control unit (100) with information representing torque requirements which the motor (112) has to deliver in order to shift the flap, wherein
    the control unit (100) comprises a second means for adapting the drive frequency of the stepper motor on the basis of the information representing the torque requirements, and
    a third means for reducing the drive frequency if the torque requirement exceeds a first threshold and increasing the drive frequency if the torque requirement becomes lower than a second threshold, wherein the drive frequency is made to vary in steps, the move from one step to another being ordered in response to the crossing of said first threshold by the detected-torque requirements.

8. Actuator according to claim 7, wherein the control unit (100) further comprises a forth means for reducing the drive frequency in response to a detected increase in the torque requirements and for increasing the drive frequency in response to a detected reduction in the torque requirements when the drive frequency is below a predetermined maximum frequency acting in response to the reception of the information representing the torque requirements.

9. Motor-vehicle air-conditioning installation, wherein the installation comprises at least one actuator according to claim 7.

* * * * *